US008150939B1

(12) United States Patent
Murray

(10) Patent No.: US 8,150,939 B1
(45) Date of Patent: Apr. 3, 2012

(54) METHOD AND SYSTEM FOR WRAPPING AND COMPONENTIZING JAVASCRIPT CENTRIC WIDGETS USING JAVA COMPONENTS

(75) Inventor: Gregory L. Murray, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1122 days.

(21) Appl. No.: 11/801,892

(22) Filed: May 11, 2007

(51) Int. Cl.
*G06F 15/16* (2006.01)
(52) U.S. Cl. ........................................ 709/217; 709/203
(58) Field of Classification Search .................. 709/203, 709/217, 219
See application file for complete search history.

(56) References Cited

U.S. PATENT DOCUMENTS

| 5,596,702 | A * | 1/1997 | Stucka et al. ................. 715/746 |
| 5,793,368 | A * | 8/1998 | Beer ............................. 715/747 |
| 6,643,652 | B2 * | 11/2003 | Helgeson et al. ..................... 1/1 |
| 6,721,747 | B2 * | 4/2004 | Lipkin ........................... 709/209 |
| 6,978,422 | B1 * | 12/2005 | Bushe et al. .................. 715/734 |
| 7,039,859 | B1 * | 5/2006 | Sundaresan ..................... 715/229 |
| 7,076,728 | B2 * | 7/2006 | Davis et al. .................... 715/205 |
| 7,509,374 | B2 * | 3/2009 | Trinh et al. ..................... 709/203 |
| 7,555,538 | B2 * | 6/2009 | Shenfield et al. .............. 709/219 |
| 7,930,343 | B2 * | 4/2011 | Zhang et al. .................. 709/203 |
| 8,056,092 | B2 * | 11/2011 | Allen et al. .................... 719/320 |
| 2002/0049603 | A1 * | 4/2002 | Mehra et al. ...................... 705/1 |
| 2002/0101448 | A1 * | 8/2002 | Sanderson ..................... 345/762 |
| 2003/0237050 | A1 * | 12/2003 | Davidov et al. ............... 715/513 |
| 2004/0046789 | A1 * | 3/2004 | Inanoria ........................ 345/748 |
| 2004/0128624 | A1 * | 7/2004 | Arellano et al. .............. 715/530 |
| 2005/0086587 | A1 * | 4/2005 | Balz .............................. 715/505 |
| 2005/0108650 | A1 * | 5/2005 | Muehlhausen ............... 715/760 |
| 2006/0005207 | A1 * | 1/2006 | Louch et al. .................. 719/328 |
| 2008/0082627 | A1 * | 4/2008 | Allen et al. .................... 709/217 |
| 2008/0086700 | A1 * | 4/2008 | Rodriguez et al. ............ 715/804 |
| 2009/0006465 | A1 * | 1/2009 | Sue .......................... 707/103 R |

* cited by examiner

*Primary Examiner* — John Follansbee
*Assistant Examiner* — Madhu Woolcock
(74) *Attorney, Agent, or Firm* — Martine Penilla Group, LLP

(57) ABSTRACT

A method and system for providing a JavaScript wrapper framework divided between a client and a server for componentizing JavaScript centric widgets includes receiving a request for a widget to be rendered on the client by a client runtime component. The request includes a tag that defines a plurality of tag attributes. The tag and the tag attributes distinctly identify the widget. The request is forwarded to the server that identifies the widget and a plurality of component resources associated with the widget based on the tag attributes received from the client. A JavaScript wrapper code is generated to wrap the widget and the associated plurality of component resources. The wrapped widget and components are forwarded to the client for rendering. The wrapped widgets are rendered at an HTML page during the initial HTML page load based on the information provided by the associated component resources. The rendering of the components enables the component resources to be evaluated in the global scope of the HTML page.

17 Claims, 12 Drawing Sheets

METHOD AND SYSTEM FOR WRAPPING AND COMPONENTIZING JAVASCRIPT CENTRIC WIDGETS USING JAVA COMPONENTS

FIELD OF THE INVENTION

The present invention relates generally to client-server computing systems, and more particularly to, a method and system for providing a wrapper framework for componentizing JavaScript centric widgets.

BACKGROUND

Description of the Related Art

Widgets are small interactive web applications that run on a browser window. A widget is a short form for Windows™ gadgets. Widgets are installed on a client and provide interactive graphical user interface (GUI). The widgets provide visual information and easy access to frequently used functions. Some of the functions that these widgets provide include news aggregators, calculators, weather forecasts, interactive maps, clock and stock quotes. These widgets provide a way to multitask and are relatively easy to develop. The early widgets, such as Confabulators, were strictly desk-top widgets and did not have the ability to access the internet. Current day widgets, including mobile widgets that are designed for mobile devices, have the capability to access the internet and provide access to resources available on the internet.

The modern day widgets use scripting language such as Java and Tool Command Language (TCL), on a server to interact with and render graphics on a graphical user interface running on a client. Most, if not all, applications that are developed today using Java, TCL or other scripting languages come equipped with a ready made library of widget, components that a programmer can incorporate into a widget application and customize. Each of the widget application developed by a programmer will include components that describe what a particular widget looks like, how it behaves, and how it interacts in response to user actions. To incorporate one or more components into a widget application on the client, a programmer needs to have working knowledge of the various components, so that the programmer will know which components need to be included in the application. Some of these components could be supplied by an external service and the programmer will have to have a knowledge of the existing Application Programming Interfaces (APIs) in order to access those components. As more components and APIs are made available, the widget application development becomes more complex.

There is, therefore, a need for uniformly componentizing various components that define each widget so that the programmers are exposed to the same set of relevant components when defining a widget application. There is also a need to simplify and standardize the widget application development process so as to minimize the development time for creating new widgets. There is also a need to make these widgets reusable so that programmers do not have to program and re-program the same set of widget applications.

SUMMARY

The present invention fills the need by providing a JavaScript wrapper framework divided between a client and a server for componentizing JavaScript centric widgets. The framework includes a client runtime component on the client. The client runtime component includes a tag that identifies a widget to be rendered on the client. The tag defines a plurality of tag attributes that distinctly identify the widget. The client runtime component is configured to load the widget when a HTML page initially loads on the client. The widget is identified on the server based on the plurality of tag attributes, the identified widget is associated with a plurality of component resources. A JavaScript wrapper code is generated for the identified widget and the associated plurality of component resources. The wrapped component resources for the identified widget are forwarded to the client in response to the request for widget resources from the client. The plurality of component resources are rendered at the client during the HTML page load or based on an event on the HTML page. The rendered widget is based on information provided by the associated plurality of component resources through the identified widget's tag. The associated component resources define the behavior and style of the resources that make up the widget.

In one embodiment, a method for providing a JavaScript wrapper framework divided between a client and a server for componentizing JavaScript centric widgets is disclosed. The method includes receiving a request for a widget at the client. The request includes a tag that identifies a widget to be rendered on the client. The tag defines a plurality of tag attributes that distinctly identify the widget. The widget is identified on the server based on the plurality of tag attributes, the identified widget is associated with a plurality of component resources. The plurality of component resources for the identified widget is wrapped using a JavaScript wrapper code and forwarded to the client in response to the request. The widget is configured to render on the client during the HTML page load or based on an event on the HTML page based on information provided by the associated plurality of component resources through the tag. The associated component resources define the behavior and style of the widget.

In another embodiment, a system for providing a JavaScript wrapper framework divided between a client and a server for componentizing JavaScript centric widgets is disclosed. The system includes a widget model and a client runtime component (CRC) on the client and a server runtime component (SRC) on the server. The widget model on the client provides a component model for the widget and includes a plurality of component resources that define behavior and style of a widget so that the widget can be accessed by other components available at the client. The CRC on the client includes a tag having a plurality of tag attributes that identifies the widget to be rendered on the client. The CRC is configured to forward a request for widget resources to the server using tag attributes, receive a plurality of component resources associated with the widget from the server, verify the correctness of the plurality of component resources received from the server, render the widget on the client and link a plurality of widgets on the client. The SRC on the server is configured to interface with the CRC on the client. The SRC is further configured to identify the widget and associated plurality of component resources at the server using tag attributes forwarded by the client; track and wrap the plurality of component resources associated with the widget available to the server, and serialize data in the plurality of component resources such that the proper data associated with the plurality of component resources are forwarded to the client.

The present invention, thus, describes a method and system for providing a JavaScript wrapper framework for componentizing JavaScript centric widgets divided between a client and a server. The embodiments of the present invention include providing runtime components on the client and the server so that the component resources can be efficiently componentized and uniformly made available to all users. The framework, thus, provides a reusable widget thereby simplifying and standardizing widget creation.

BRIEF DESCRIPTION OF THE DRAWINGS

The invention may best be understood by reference to the following description taken in conjunction with the accompanying drawings. These drawings should not be taken to limit the invention to the preferred embodiments, but are for explanation and understanding only.

DETAILED DESCRIPTION

Figure 1A:
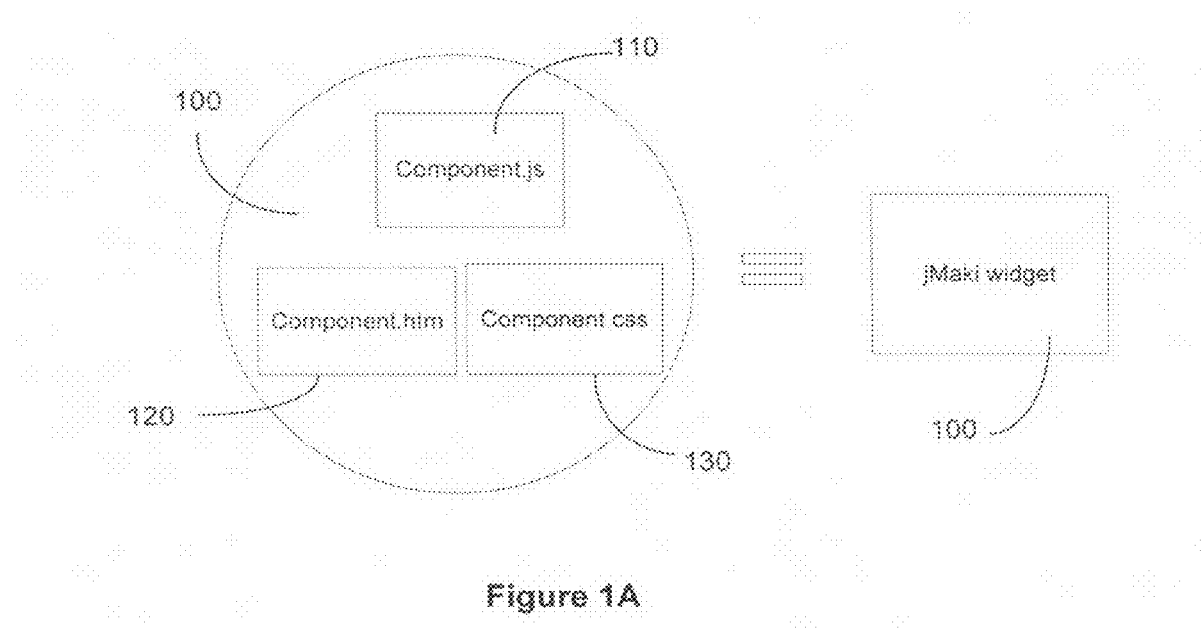
FIG. 1A illustrates a basic widget model used in a JavaScript wrapper framework with the associated components, in one embodiment of the invention.

The present invention provides a JavaScript wrapper framework divided between a client and a server for componentizing JavaScript centric widgets. The wrapper framework provides logic on the client that is used to interact with server-side logic to dynamically identify a plurality of components associated with a widget, generate JavaScript code to wrap the widget and the associated component resources and render the components on the client during an HTML page load or based on an event on the HTML page. The generated JavaScript code wrapping the widget with the appropriate component resources may be stored in a widget library on the server so as to enables one to re-use the widget without having to independently develop the widget. Moreover, the widget development is more structured and organized so that each widget when rendered at the client, use the appropriate component resources. The wrapping of the widgets can be customized to allow the same widgets to be rendered multiple times on the HTML page without conflicts when referring to the respective widget's component resources.

Several embodiments for providing a JavaScript wrapper framework for componentizing JavaScript centric widgets are described. It should be appreciated that the present invention can be implemented in different ways such as a system or a method. It will be apparent to those skilled in the art that the present invention may be practiced without some or all of the specific details set forth herein.

To facilitate an understanding of the embodiments, a basic widget model associated with a widget rendered at the client will be described first. The process of the disclosed embodiments will then be described with reference to the basic model. In the current application, browser, browser client and client are used interchangeably to refer to a client in a client-server computing system. A client is a computer or computing device that runs client software (referred to as a browser) to access the Internet and render content.

In order to facilitate creation and/or rendering of a widget on the client, a JavaScript wrapper framework, a jMaki framework, is provided. The jMaki framework includes JavaScript to define a wrapper code for a widget to be rendered on the client. JavaScript is a client-side and server-side scripting language used mainly within a HTML page to create interactive pages. JavaScript is a platform-independent algorithm that can run on most any basic hardware and software platforms. Thus, JavaScript is not dependent on any specific hardware and will run on any computer with a Java Virtual Machine software. The jMaki framework includes a client-side component and a server-side component. The client-side component and server-side components further include a plurality of components. The components within the client-side component include a widget model and client runtime component. The server-side component includes a server runtime component and a generic proxy component.

A basic widget model associated with a widget rendered on a client is illustrated in FIG. 1A as a jMaki widget 100. The jMaki widget 100 provides a component model for the widget and is essentially made up of re-usable JavaScript components. The three core components that define the jMaki widget 100 include a HTML template component 110, a JavaScript initialization and configuration code component 120 and a Style sheet component 130. The HTML component 110 defines the content of the widget, the JavaScript component 120 defines the behavior of the widget and the Style sheet component 130 defines the style of the widget's display. The JavaScript component 120 contains JavaScript code that is used to wrap the widget and the various component resources of the widget together, handle user-initiated events generated by the widget and interacts with the server-side component using an asynchronous JavaScript and XML (AJAX) mechanism. The widget model structure described herein can be used in creating a new widget or wrap existing widgets from any toolkit available to the client.

Figure 1B:
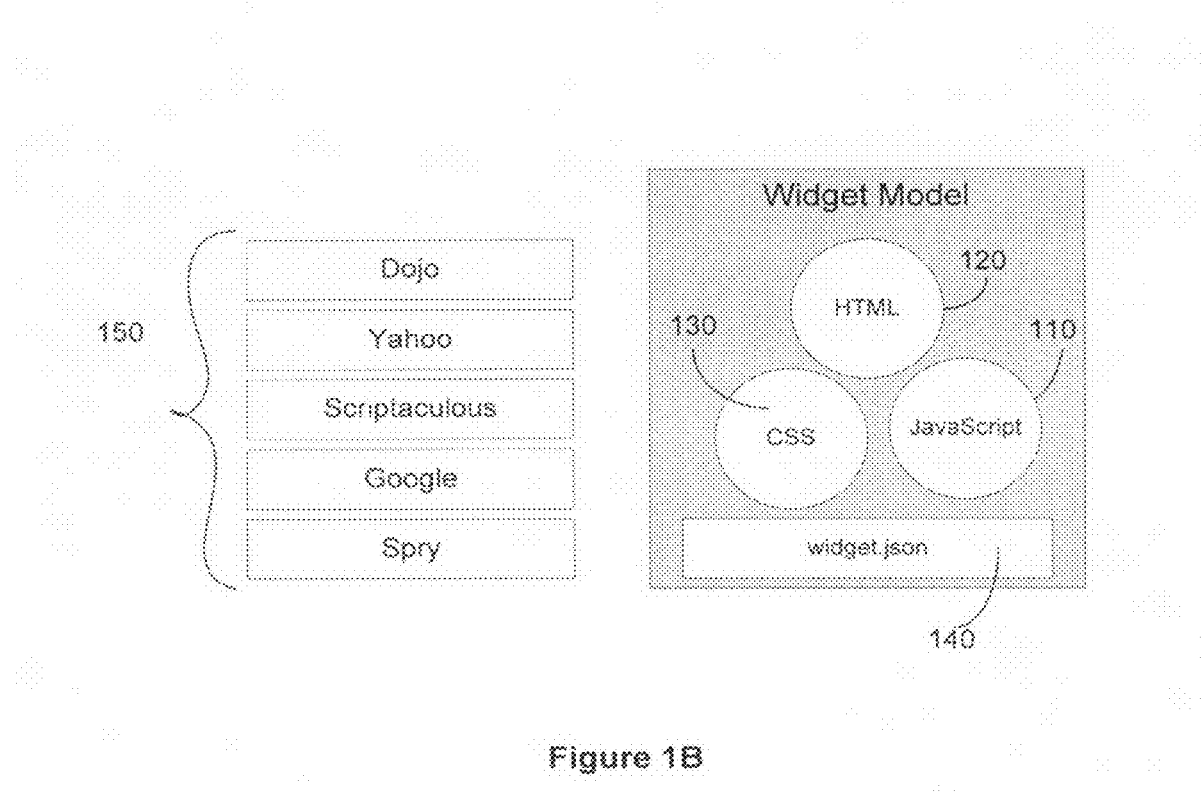
FIG. 1B illustrates the widget model with components accessing external services, in one embodiment of the invention.

In addition to the three core components, the widget model may include a widget JavaScript Object Notation (JSON) component 140, as illustrated in FIG. 1B. The JSON component 140 describes the widget's attributes and the format of the data that the widget can accept from external services through a toolkit interface. The widget defined on a client may include component resources that access one or more external services. The jMaki framework provides the wrapper code for the widget so that the widget may be interact with external services through the respective toolkit interfaces 150 such as Dojo toolkit, Yahoo User Interface (UI), Scriptaculous interface, Google UI, Spry UI, Prototype and some native widget toolkits. Although the commonly used toolkits have been identified in this embodiment, other toolkits that provide widget components may also be used.

Figure 2:
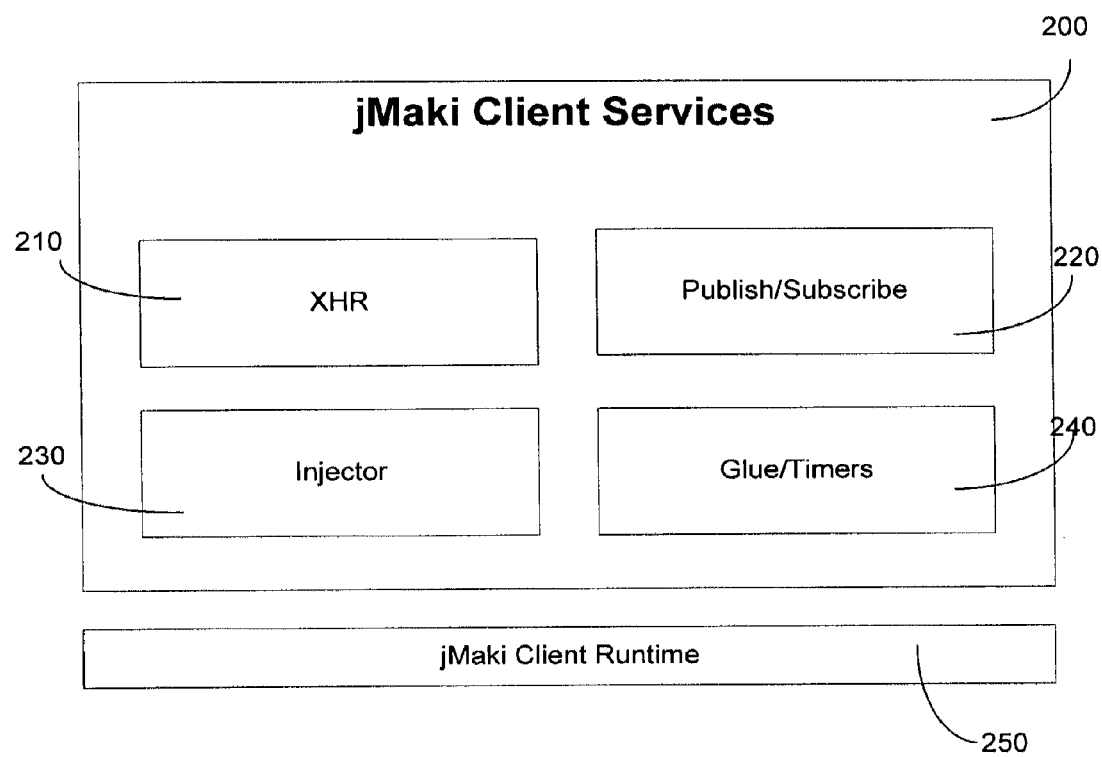
FIG. 2 illustrates client runtime component architecture, in one embodiment of the invention.

In addition to the widget model, the client includes a client-side services component to access and interact with internal and external services for obtaining component resources for defining and for pre-defined widgets. The client-side services component includes application program interfaces (APIs) to interface with internal and external services located either in a same web domain as an application executing on the client that is requesting a widget or on different web domains. FIG. 2 illustrates sample client-side APIs, that allow the widget to interface with internal services located within a single domain, available at the client. The client-side services are provided as a means of communication between various widgets available at the client.

The client-side services component 200 includes an XMLHttpRequest (XHR) API 210 to request and receive resources through an asynchronous JavaScript and XML (AJAX) mechanism, a publish-subscribe mechanism API 220 that facilitates inter-widget communication by allowing a widget to register and publish an event for the widget defined by a topic so that other widgets can subscribe to the topic; an Injector API 230 to bring and load contents including widgets from a separate Uniform Resource Locator (URL) than the one that the server is residing on. In this embodiment, the separate URL is hosted within the same web application domain as the one hosting the application executing on the client. A topic defining a widget is used when publishing or subscribing to an event associated with the widget so as to allow anonymity of the actual widgets during inter-widget communication. The events to the topic may be published based on a user action or based on an automatic timer mechanism. The subscription to the events may be based on what is published. The client-side services component also includes a Glue/timer API 240 that allows defining widget application behavior and ties widgets together using JavaScript actions when a specific event is published to a topic. The Glue/timer API 240 is mostly used with the publish-subscribe mechanism API 220.

The client-side component also includes a jMaki client runtime component 250. The client runtime component 250 is responsible for bootstrapping widgets and passing widget related information received from the server to the appropriate widgets on the client. In one embodiment, the communication between the server and the client is through AJAX mechanism. The client runtime component 250 ensures that the widget related information, such as input attributes, is unique for each widget and each of the widgets is passed only the appropriate widget related information. The client runtime component also ensures that the properties of each widget components are uniformly shared among other widget components available at the client. Thus, the embodiments of the invention define reusable components that are defined and shared amongst widgets available on the client.

Figure 3:
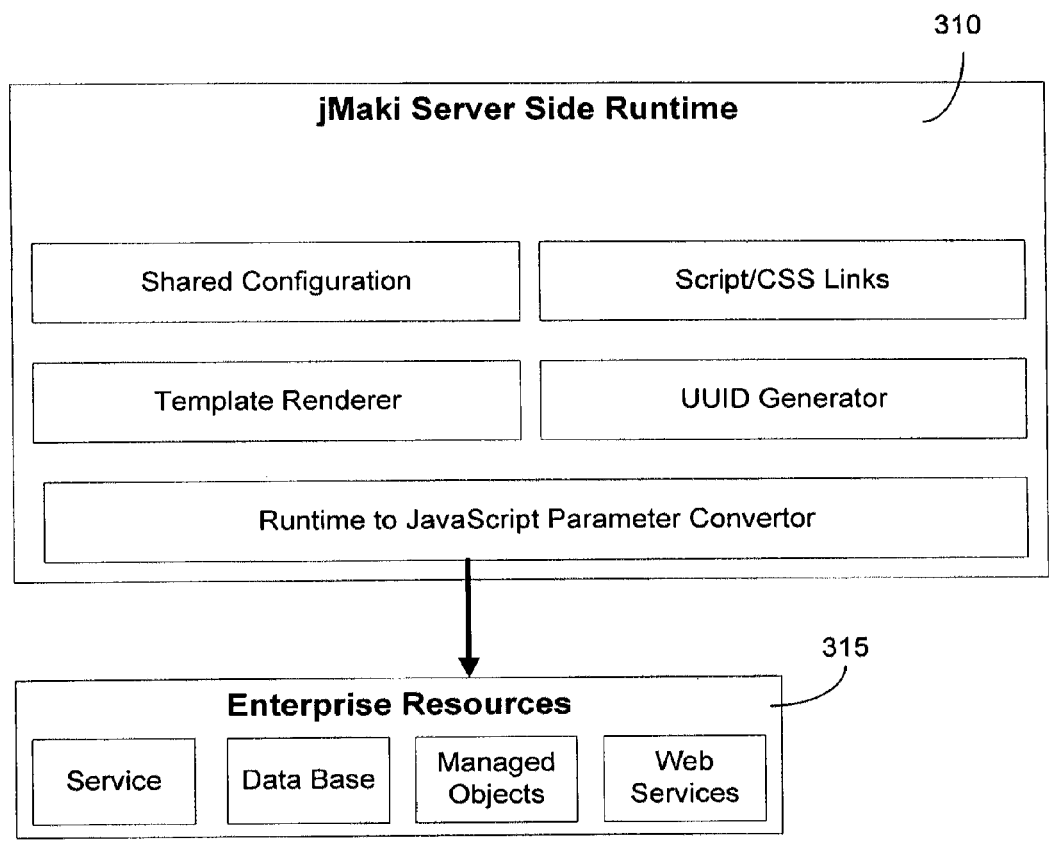
FIG. 3 illustrates server runtime component architecture, in one embodiment of the invention.
Figure 4:
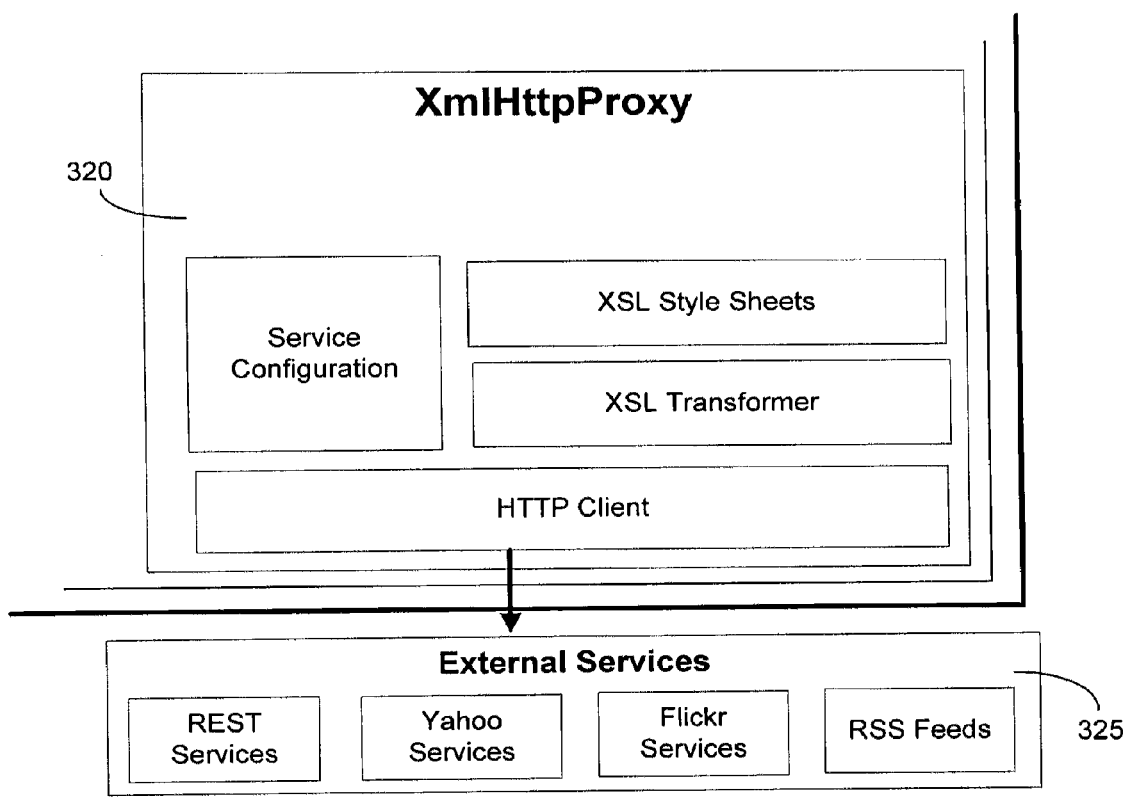
FIG. 4 illustrates a generic proxy runtime component architecture, in one embodiment of the invention.

The server-side components include a jMaki server runtime component 310 and a generic proxy component 320, as illustrated in FIGS. 3 and 4. The jMaki server runtime component 310 ties the jMaki client runtime component 250 with the server through a server-side interface such as a Java servlets or servlets developed in other scripting languages such as PHP: Hypertext Preprocessor (PHP) or Phobos. The server runtime component 310 identifies and tracks the corresponding component resources that make up the widget based on one or more input attributes received from the client. The input attributes from the client define a type of widget requesting component resources, which is, then, used to identify the widget available to the server. When a widget is first created on the server, a plurality of component resources are first identified at the server, wrapped using JavaScript wrapper code and stored in a library. A plurality of widget libraries may be available to the server. The input attributes received from the client provide the keys to uniquely identify the widget library available to the server in which the widget resources are stored. In this embodiment, the widget and the corresponding widget components are hosted on a single domain. The widget libraries are organized such that each widget and its associated component resources can be uniquely identified. The widget libraries may use a directory file structure to store the component resources for each widget. The input attribute, such as a "name" attribute, may be used to map to the appropriate directory on the server that contains the component resources for the specific widget. The directory structure is organized in such a way as to distinguish one widget's resources from another widget's resources. In one embodiment, the directory for the various widgets on the server is a resource directory and the resource directory structure is explained in greater detail with reference to FIGS. 8A and 8B further below.

Referring back to FIG. 3, the server runtime component 310 includes a plurality of sub-components that are used in identifying, configuring, linking, converting, and wrapping the various component resources associated with the widget into a server-side widget for rendering at the client. The component resources that make up the server-side widget may include objects from various resources. The various resources from which the component resources are obtained are identified as enterprise resources 315 in FIG. 3. The enterprise resources 315 include service resources, database resources, managed object resources and web service resources. The web service resources, in this embodiment, include resources that are hosted in the same web application domain as the one hosting the application executing on the client.

The widgets on the client may require access to external services that are outside the web application domain. In such cases, the client is equipped with an Asynchronous JavaScript and XML (AJAX) mechanism to enable asynchronous communication between the widget on the client and the external services. In this embodiment, the server is equipped with a generic proxy component (generic proxy) 320, such as an XMLHttpProxy component, to interact with the external services 325, as illustrated in FIG. 4. The generic proxy 320 on the server receives the AJAX request from the client and interacts with the external service 325 on the client's behalf. The generic proxy 320, in addition to interacting with the external services 325, is configured to interact with other server-side components such as the servlets and the server runtime component. The generic proxy 320 may be developed using JavaScript code or may be developed using other scripting languages.

The generic proxy 320 is also configured to perform data conversions so that varied data formats received from the external services are restricted. In order to address the data format restrictions, the generic proxy 320 is endowed with a transformer, such as an XSL transformer, as shown in FIG. 4. As mentioned, the external services may include component resources that may be defined in different standards than the component resources defined within the web application domain. In such cases, the generic proxy 320 engages the XSL transformer, to transform the format of one or more component resources to a format that is acceptable to the widget so that the widgets can access these component resources in a uniform way. For example, the external services may include component resources encoded in extensible markup language (XML) standard. In this case, an extensible stylesheet language (XSL) is used to describe how the XML styled component resources have to be formatted and transformed. A XSL transformer, available to the generic proxy 320, provides an XSL-to-JSON transformation so that the transformed components defining the widget can be accessed by the client.

Although a specific format transformer has been specified in this embodiment, the transformer is not restricted to XSL formatted components but can be extended to other format transformations. Further, this transformer may be customized to suit the specific widget requirements. The generic proxy 320 (XMLHttproxy component), thus allows an AJAX enabled client to access external services outside the web application domain, such as Representation State Transfer (RESTful) web services that provide Rich Site Summary (RSS) feeds, Yahoo Geocoding service and Flickr image searches, to name a few.

In order to allow the widget to access external services, the input attributes include one or more API keys that were originally provided to the client by an external service during an initial request from the client. In this embodiment, the external service resources are identified using the API keys. The API keys may be generic to a particular external service or may be specific to a particular widget resource. The API keys allow the various widget applications to use a single configuration in a configuration file to reliably access the same external services. The various widget applications receive appropriate component resources associated with the widgets from the external services based on the input attributes passed in the request.

Figure 5:
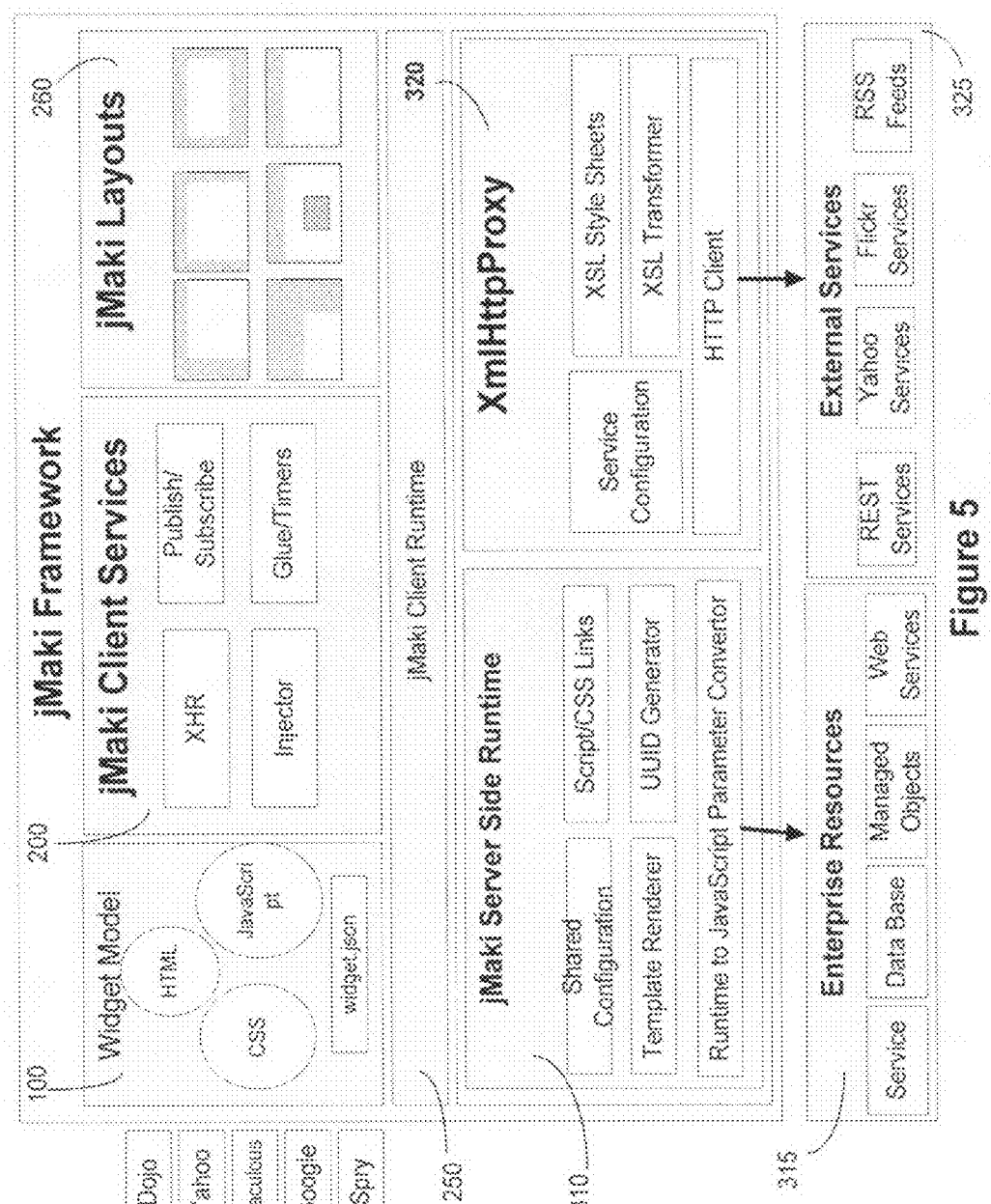
FIG. 5 illustrate a JavaScript wrapper framework architecture, in one embodiment of the invention.

FIG. 5 illustrates the overall jMaki framework that includes the client-side components and the server-side components. The client-side components, as already explained, include a widget model component 100 to define the component model, a client services component 200 to bootstrap widget instances, load script dependencies, make asynchronous requests, load additional resources, provide inter-widget communications and store widget instances to be shared across an application. The client-side components also include client runtime component 250 to interact with the server-side component, link the components, ensure that the correct component resources are received for each widget, and render the component resources to the client for rendering. In addition to the components listed above, the client side components also includes jMaki layout component (jMaki layout) 260 which is used to provide standard layout templates that can be used in creating new widgets on an HTML page to be rendered at the client.

The server-side components include the server-side runtime service component 310 and a generic proxy component 320. The server runtime component 310 ties the jMaki client runtime component with the server-side interface and identifies and tracks the corresponding component resources that make up the widget based on one or more input attributes received from the client. The widget component resources are gathered and wrapped using JavaScript code into a JavaServer Phase custom tag handler or JavaServer Faces component and stored in a widget library. A library of widgets, as explained earlier, may be available to a server and include instances of these custom wrapped widget components so they can be re-used. For widgets that are not part of the library and having component resources that are not wrapped using the JavaScript code, new component resources are defined by wrapping the existing component resources with JavaScript code. These newly wrapped component resources may be stored in the library of widget components available to the server under the specific widget so they can be re-used. The generic proxy component 320 interacts with other server-side components and external services and performs data conversions so that varied data formats received from the external services are restricted.

Figure 6:
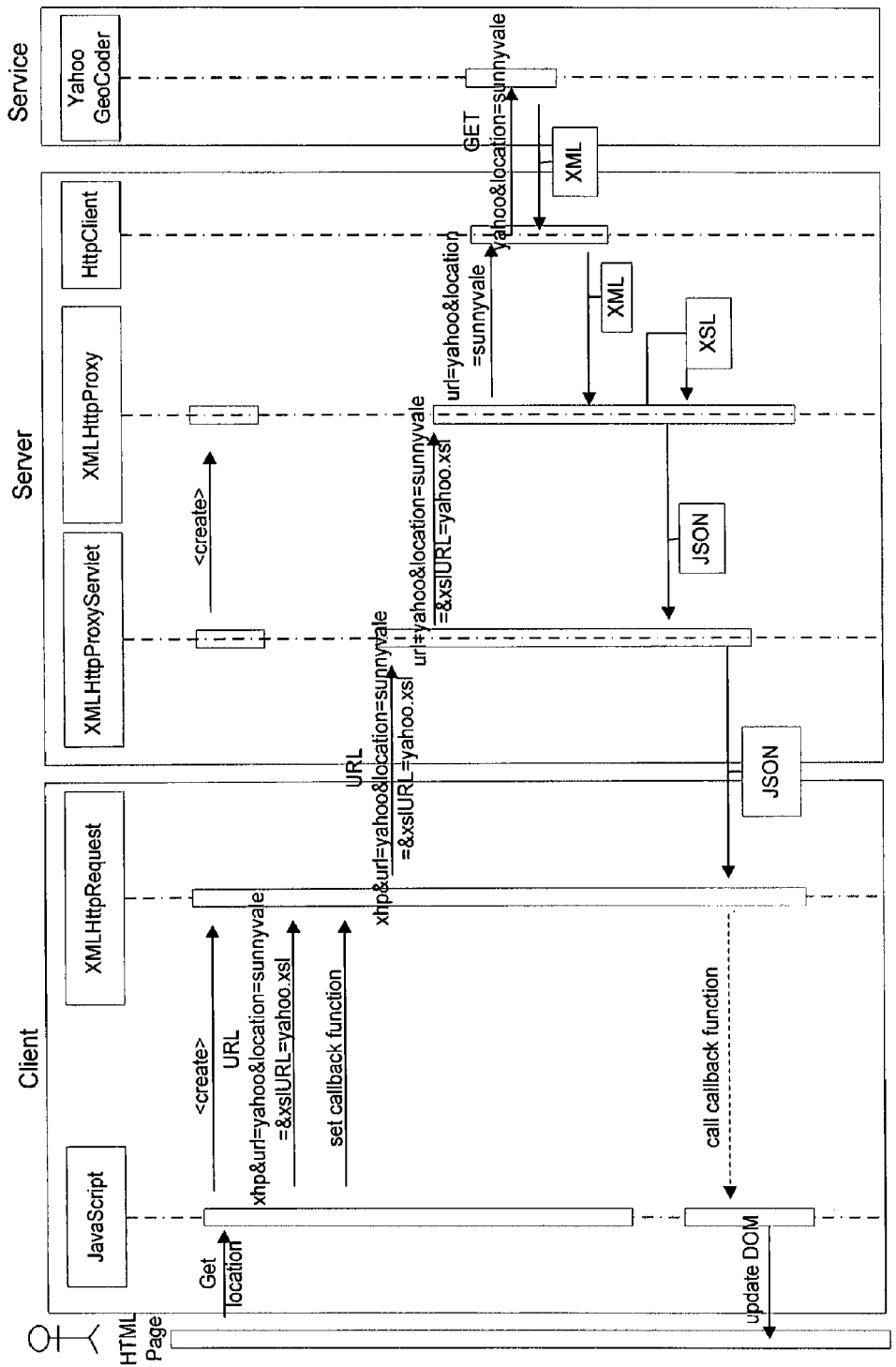
FIG. 6 illustrates a sequence flow diagram along with a generic proxy server runtime component, in one embodiment of the invention.

FIG. 6 illustrates the sequence flow diagram of a jMaki widget, in one embodiment of the invention. The jMaki widgets are rendered at the client in a two-step process that scans both the client and the server. A request for a widget is received at the client during an initial Hyper Text Markup Language (HTML) page load or based on an event on the HTML page. The HTML page may use Java Server Pages (JSP) to display content. The JSP uses tags to define the content of the HTML page. A tag handler is used to evaluate the tags during the execution of a JSP embedded HTML page that references the tag. When the request for a widget is received at the client, the request is forwarded to a server using one or more tag attributes associated with the widget request. In one embodiment, the request from the client is forwarded to the server asynchronously as an XMLHttpRequest using XHR API 210. The request is received by a server-side component (a jMaki component) on the server through a servlet. In the embodiment that uses asynchronous communication, the server-side component receives the request from the client through an XMLHttpServlet on the server.

The server-side component includes the server runtime component and a generic proxy component. The server runtime component receives the request and uses the tag (input) attributes to identify the appropriate widget and the associated component resources for the widget available to the client. If the request is for component resources that are hosted on the same domain as the web application, the server runtime component looks to a widget library resident on or available to the server to identify the relevant component resources. If the identified resources are found in the widget library, links to the resource component are defined and wrapped together by the server runtime component and forwarded to the client for rendering. In the embodiment where the request from the client is an asynchronous request, the response from the server runtime component is asynchronous, in the form of an XMLHttpResponse.

A default widget resource directory is maintained at the server to include default component resources for each of the widgets accessible by the client. In the case where the widget component resources are not located in the appropriate widget library of the server, the server runtime component uses the default widget resource directory to identify the appropriate default resource components. The identified default resource component links are then wrapped and forwarded to the client as a response to the request.

In one embodiment, the widget request from the client may include request for component resources from external services that are outside the web application domain of the application executing on the client. In this embodiment, the request from the client is sent to the server as an XMLHttpRequest. The server receives the request through an XMLHttpProxyServlet, as illustrated in FIG. 6. The request is then forwarded to a generic proxy on the server, such as an XMLHttpProxy. The XMLHttpProxy uses a HttpClient to access the external service on the client's behalf and receive XML data which is then returned to the XMLHttpProxy. The generic proxy also includes a transformer, such as an XSLT transformer to transform the format of the component resources to a format that is acceptable by the client, such as a JavaScript Object Notation (JSON) format. The transformed component resources are forwarded to the XMLHttpProxyServlet instance, which interacts with server runtime component to wrap the component resource links and passes the wrapped component resource links back to the client for rendering. The generic proxy provides a way for the application on the client to access external services and acts as a buffer between the external service and the client by eliminating exposure of the client components to the external services thereby avoiding potential security risk. The data conversion component provides a more robust jMaki interface that allows the client to access wide variety of component resources without having restriction on formats.

Figure 7:
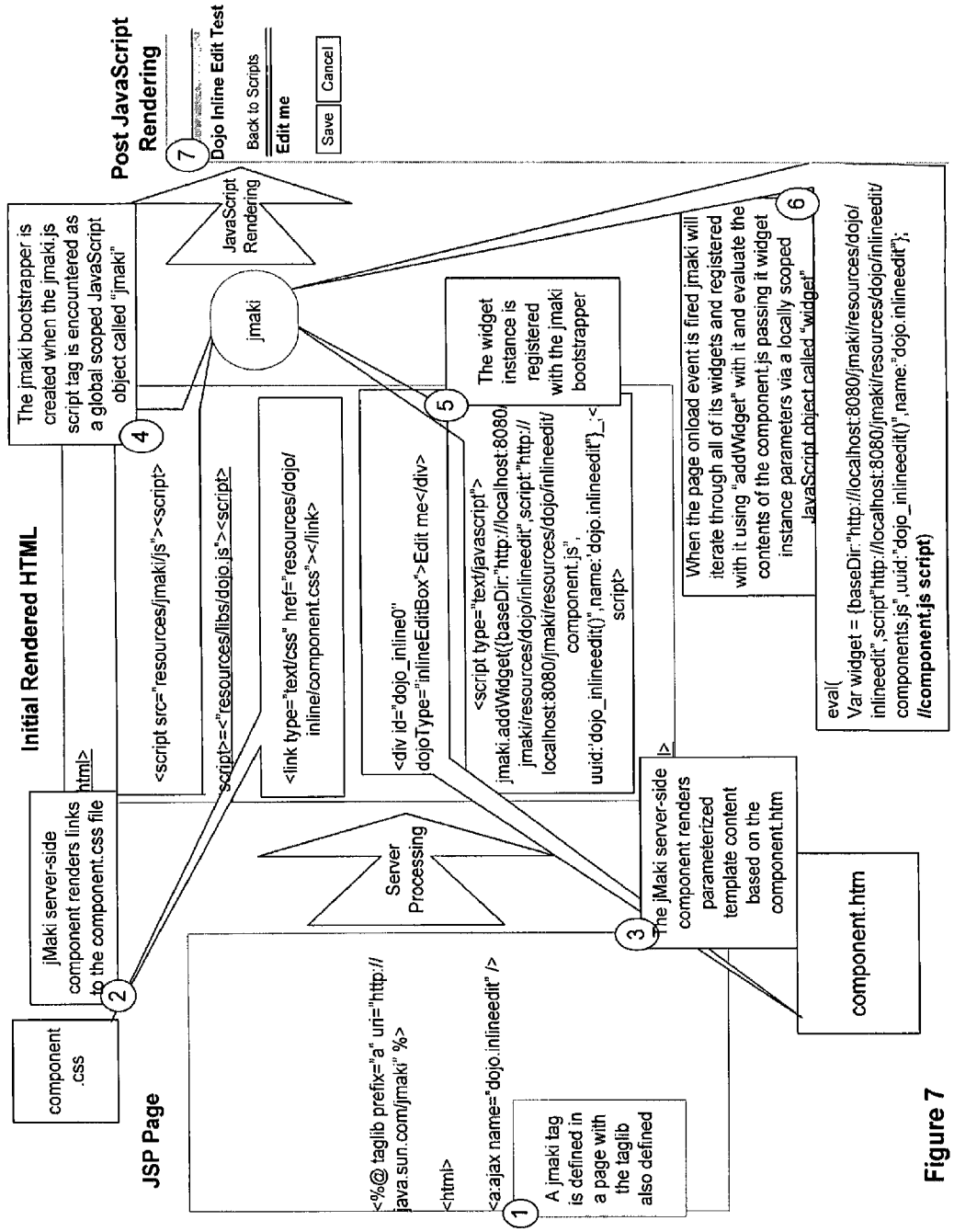
FIG. 7 illustrates a JavaScript wrapper framework lifecycle, in one embodiment of the invention.

The life-cycle of a JavaScript wrapper framework (jMaki) widget is illustrated in FIG. 7. The life-cycle of the jMaki widget provides a detailed view of how the jMaki widgets are created and initialized. In operation 1, a defined jMaki widget is encountered. A jMaki widget is defined on a HTML page using a JSP tag handler or a JSF component. Other ways of defining the jMaki widget may be used as the present invention is not restricted to a JSP tag or JSF component to define the jMaki widget. The defined jMaki widget is created by adding the required jMaki resources and widget resources for the specific widget to the application that loads the HTML page on the client. The defined jMaki widget may be configured with a variety of properties using a plurality of input attributes on the JSF component or using a JSP tag. The input attributes help in identifying a specific widget defined on the HTML page and may include properties such as name of the component, script for the component, template for the component, style sheet for the component, service value associated with each component instance, value associated with each component instance, arguments and type to specify a library or a set of libraries. The type attribute is used to provide a mapping to the jMaki tag with the appropriate services available to the server, through a configuration file.

The tag handler uses the input attributes received from the client to identify a widget defined on the server. The jMaki server side component receives the request from the client through a Java servlet and identifies the widget's component resources (including the template and style sheets) and forwards links to the identified component resources to the client, as illustrated in operations 2 and 3. The JSP tag handler or the JSF component renders the necessary component resource contents along with proper linkages to the HTML page. A jMaki bootstrapper code is created and rendered to the HTML page and initialized by a JSP tag or a JSF component, as shown in operation 4. The bootstrapper code is written in JavaScript and is used to register, load and support the jMaki widgets component resources being rendered at the HTML page. After the component resources for the widget and the jMaki bootstrapper code have been rendered on the page, a widget instance for each of the widgets available to the HTML page is registered with the jMaki bootstrapper, as shown in operation 5. Based on an event on the page, such as "onload", the jMaki bootstrapper will go through the various widget instances that are available to the HTML page and initialize each one of the widget instances and render the widgets on the HTML page, as shown in operation 6. Once rendered, the HTML page is made available at the client for further event processing, as shown in operation 7. The widgets may depend on additional widgets for rendering one or more component resources associated with the widget. The registering and initializing of the component resources and each of the widgets ensures that the dependencies are also initialized and rendered.

In order for the widgets to uniformly share their resources and to provide a means to respond to jMaki widget events, a publish-subscribe mechanism maybe used. One or more component resources are configured to publish contents to a particular topic of interest. The application running on the client may subscribe to the topic by adding a listener to a widget event and then subscribing to the event.

Figure 8A:
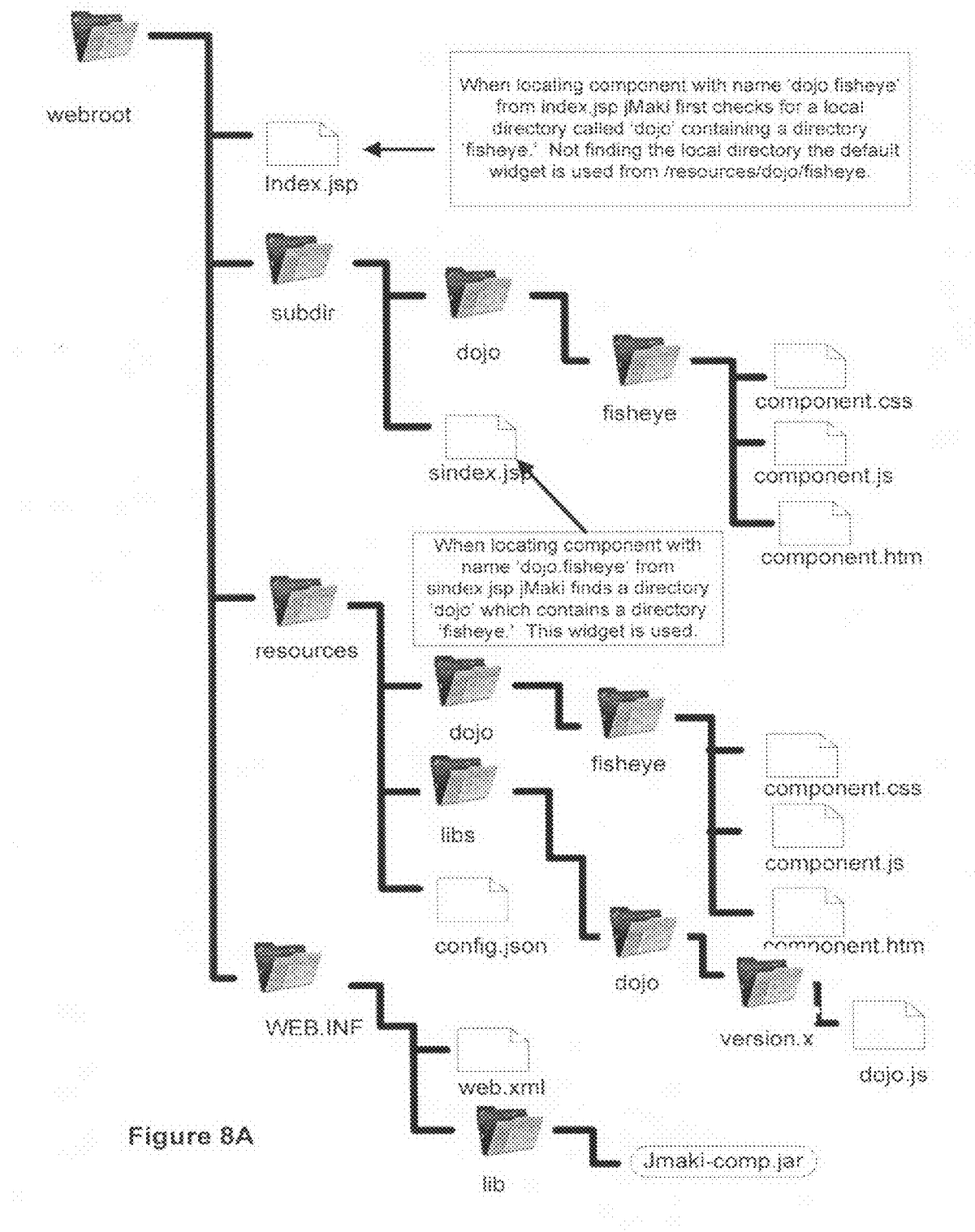
FIGS. 8A and 8B illustrates resource location maps for a set of resources associated with a widget using service available to the server, in one embodiment of the invention.
Figure 8B:
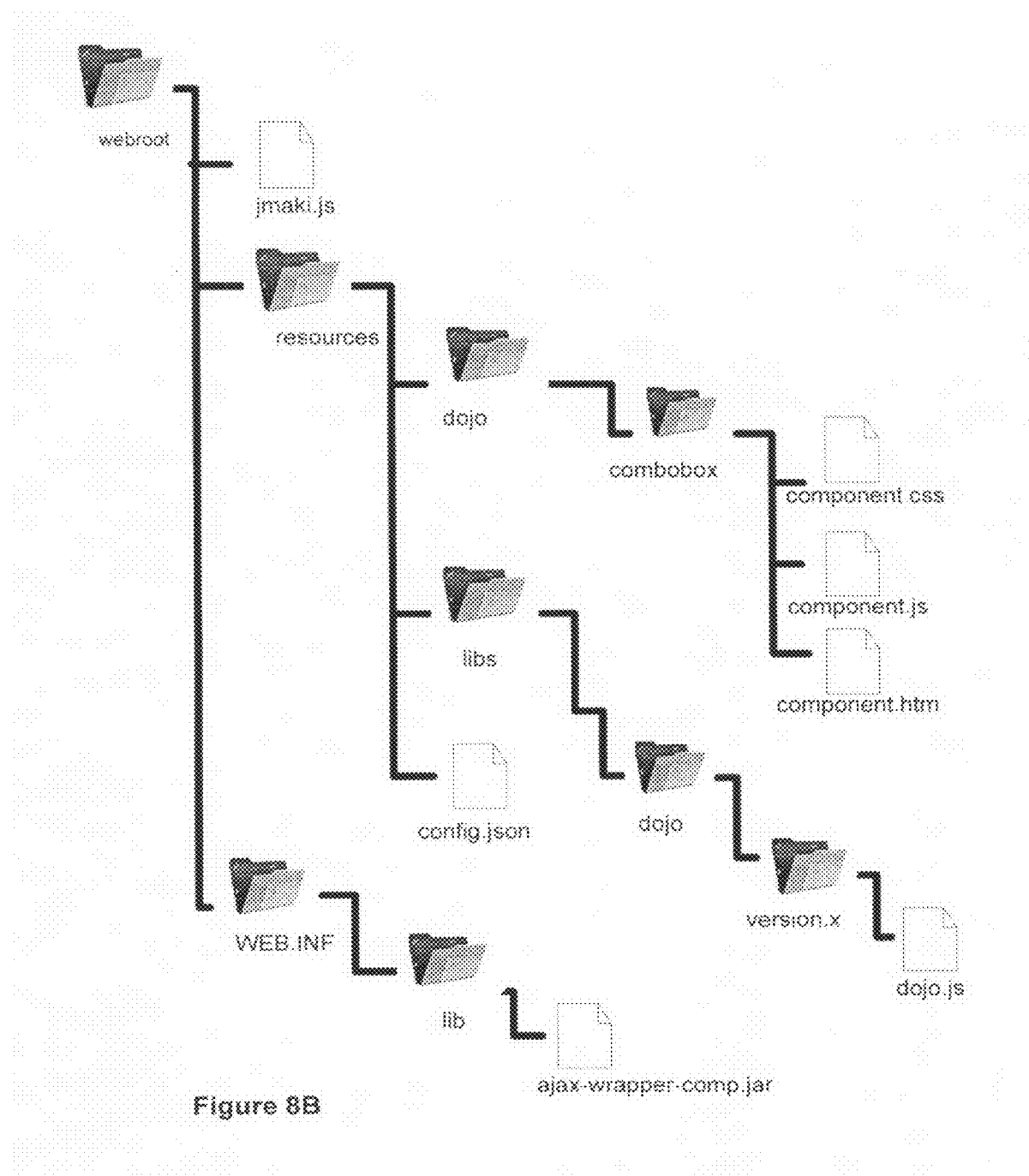

FIGS. 8A and 8B illustrate the jMaki application structure as defined on the server in some embodiments of the invention. The jMaki core bundle contains the most basic AJAX based web application containing a widget. In one embodiment illustrated in FIG. 8A, at the very top level of the application structure are the index files. The index files help in locating the widget component resources first at a local widget directory level and if unavailable at a local directory level then at a root level. Each level will include an index file for that level. The resource directory includes all the component resources for the widget.

In an embodiment where the component resources for the widget are from services either internal or external to the web application domain, a configuration file, such as a config.json, is available to locate a resource directory/library for the service to obtain the necessary component resources, as illustrated in FIG. 8B. The configuration file contains configuration information of the third-party libraries including the location, API keys, global styles associated with a specific library that might be used by the widget on the client. In addition, the configuration file will include configuration information of the internal service libraries including the location, styles, etc. The jMaki framework allows for multiple versions of a library in an application by using version numbers.

Figure 9:
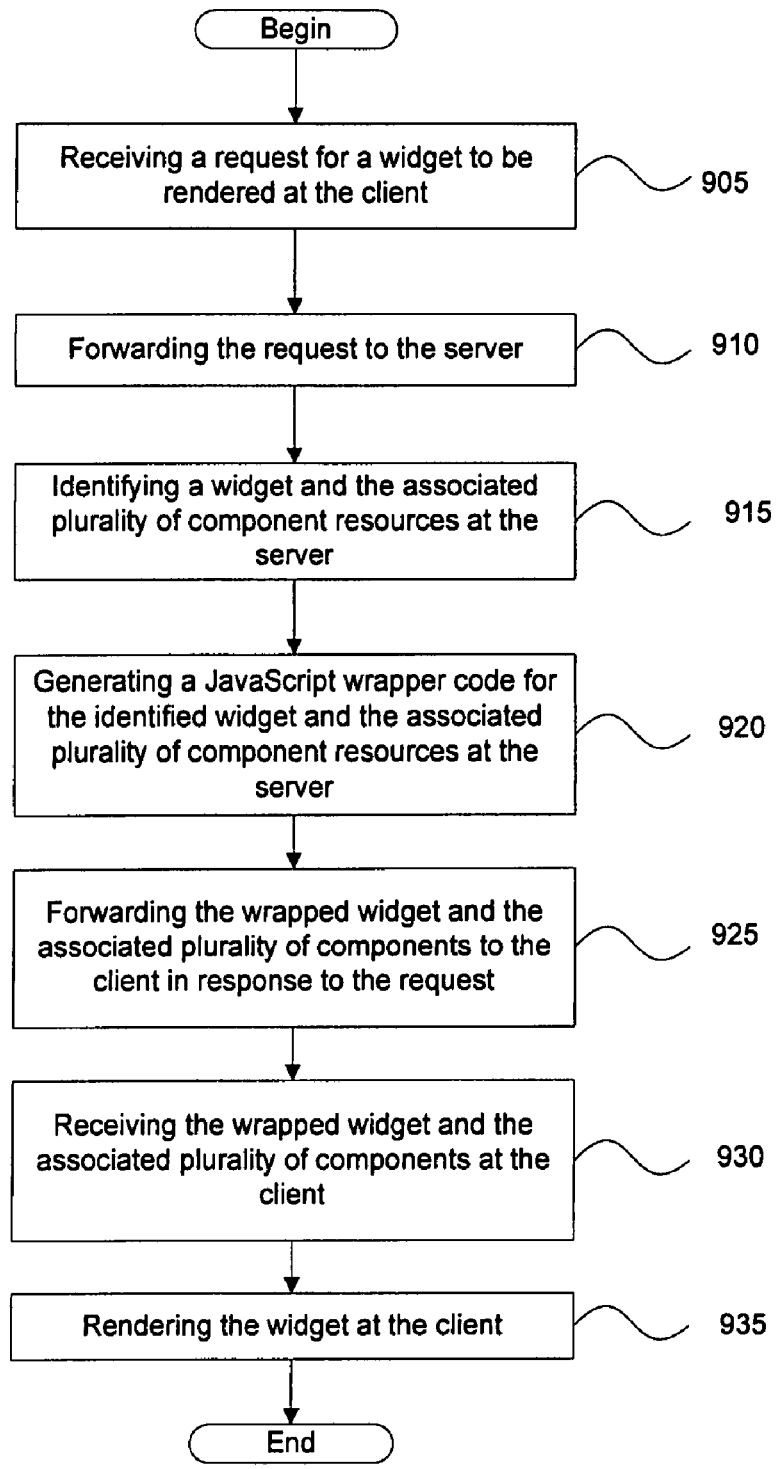
FIG. 9 illustrates a flow chart of the operations involved in providing a JavaScript wrapper framework for componentizing JavaScript centric widgets, in one embodiment of the invention.
Figure 10:
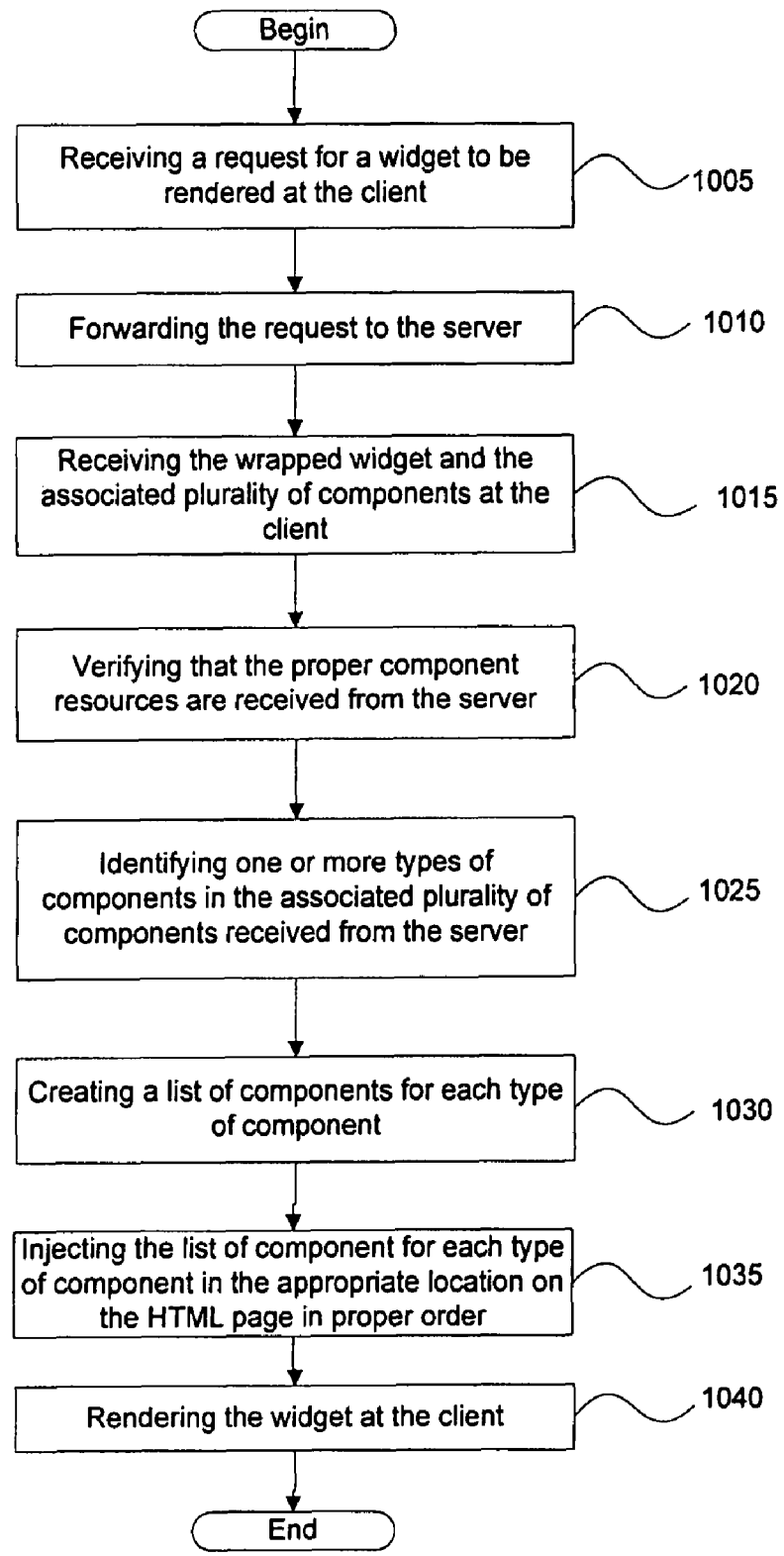
FIG. 10 illustrates a flow chart of client-side operations involved in providing a JavaScript wrapper framework for componentizing JavaScript centric widgets, in one embodiment of the invention.
Figure 11:
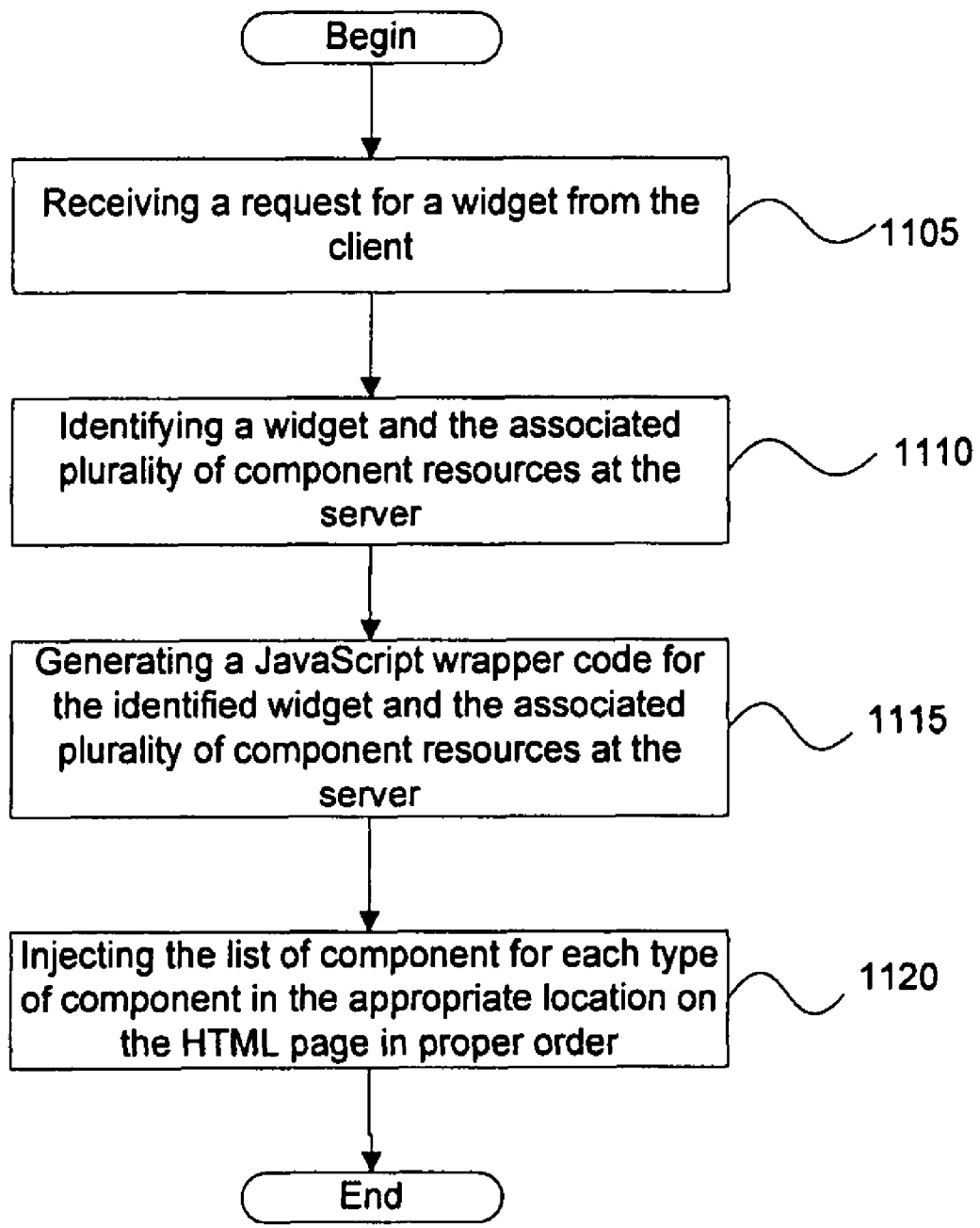
FIG. 11 illustrates a flow chart of server-side operations involved in providing a JavaScript wrapper framework for componentizing JavaScript centric widgets, in accordance with one embodiment of the invention.

With a system and component model explained earlier, a method for providing a JavaScript wrapper framework divided between a client and a server for componentizing JavaScript centric widgets will now be described in detail with reference to flow charts illustrated in FIGS. 9, 10 and 11. FIG. 9 illustrates the process operation involved in providing a JavaScript wrapper framework in one embodiment of the invention. FIG. 10 illustrates the client-side operation and FIG. 11 illustrates the server-side operations involved, in one embodiment of the invention.

Referring to FIG. 9, the method begins with a request for a widget received by a client, as illustrated in operation 905. The request may be caused by an initial HTML page load by an application executing on the client or based on an event on the HTML page. A JavaScript wrapper code for the JavaScript wrapper (jMaki) framework is encountered and initialized at the client. The request for the widget is received by a client runtime component. The request for the widget includes a tag that identifies the widget to be rendered on the client. The tag defines a plurality of tag attributes received at the client that distinctly identifies the widget. The tag attributes are also referred in this application as input attributes. The client runtime component is configured to load the widget when a HTML page loads on the client or based on an event on the HTML page. The request for the widget is forwarded to the server, as illustrated in operation 910. The request is received at the server by a server runtime component through a Java servlet.

The server runtime component identifies the widget and the associated plurality of component resources available at the server using the input attributes received from the client, as illustrated in operation 915. The component resources are static resources. A JavaScript wrapper code is generated for each of the component resources and for the identified widget and the widget and the associated component resources are wrapped using the JavaScript wrapper code, as illustrated in operation 920. A link to the wrapped widgets and the associated plurality of component resources are forwarded to the client in response to the request, as illustrated in operation 925. The forwarded links to the widget and component resources are received by the client runtime component, as illustrated in operation 930. The widget is rendered at the client during the HTML page load or in response to the event on the HTML page based on information received from the plurality of component resources, as illustrated in operation 935. The process concludes upon rendering of the widget on the client. The associated component resources define the behavior and style of the resources of the widget.

The client-side operations will now be described with reference to FIG. 10. The client-side operations begin with a request for a widget received at client runtime component on the client, as shown in operation 1005. The request may originate from a HTML page during the initial HTML page load or based on an event on the HTML page. The client runtime component will recognize the jMaki widget request and initialize the jMaki bootstrapper code. Upon initialization, the jMaki bootstrapper code will be able to initialize each widget instance available at the HTML page for rendering. The request for the widget's component resources is then forwarded to a server, as illustrated in operation 1010.

In one embodiment, the request is forwarded to a server using an XMLHttpRequest API interfacing with an AJAX mechanism at the client. The client receives a plurality of component resources associated with the requested widget from a server runtime component in response to the initial request from the client, as illustrated in operation 1015. In the embodiment where the request is sent as an AJAX request, the server runtime component forwards a link to the widget resources to the client as an AJAX response.

Upon receipt of the response, the client runtime component verifies to ensure that proper resources from the server for the specific widget have been identified, as illustrated in operation 1020. An Injector component associated with client services component parses the original HTML page to obtain a list of component resources that are already rendered on the HTML page. The Injector component, then, parses the component resources of the specific widget from the server based on the link to determine the type of component resources to be received for the specific widget, as illustrated in operation 1025.

Upon identifying the type of component resources to be received, the Injector component creates a list of plurality of components for each type of component resource to be received for the widget, as illustrated in operation 1030. The Injector then injects the list of components for each type of component in the appropriate location on the HTML page ensuring that each component resources injected into the HTML page is distinct and is in the order they appear in the widget of the HTML page, as illustrated in operation 1035. The injection of the component resources enables the component resources to be evaluated in the global scope of the page. The process completes upon rendering the widget on the client, as illustrated in operation 1040.

The server side operations will now be described with reference to FIG. 11. The server side process begins when a request for a widget is received from the client, as illustrated in operation 1105. The request from the client may include a plurality of input attributes that identify the widget on the server. The input attributes may additionally point to a service that is either internal to a web domain on which an application requesting the widget components is executing on the client or external to the web domain. The input attributes from the client may include the API keys. The API keys are used to identify an appropriate widget library available to the server or to interact with the external service through a generic proxy where the component resources for each corresponding widgets are maintained.

A widget library associated with each widget maybe in a resource directory on the server. The API keys identify the specific widget in the widget library using a type mapping wherein a type attribute identifies the widget type requested. The widget and the corresponding component resources are identified by a server runtime component available at the server using these input attributes, as illustrated in operation 1110. The server runtime component includes the JavaScript code to identify the resource components for the widget based on the API keys and other input attributes, link the components together, and generate a JavaScript wrapper code for the widget and the associated component resources, as illustrated in operation 1115. The wrapped component resources may be stored in a library, such as a resource directory, on the server so that these component resources may be reused. The process concludes when a link to the wrapped components for the identified widget is forwarded to the client in response to the request, as illustrated in operation 1120.

By providing a framework that includes client-side components and corresponding server-side components, an effective JavaScript wrapper framework is provided to componentize the JavaScript centric widgets so that they could be rendered on the client. These widgets can be reused without requiring a developer to have in-depth knowledge of the JavaScript code or the jMaki code.

The invention is not restricted to the computer system configuration as used in this application. The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be obvious, however, to one skilled in the art, that the present invention may be practiced without some or all of these specific details. In other instances, well known process operations have not been described in detail in order not to unnecessarily obscure the present invention.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing a JavaScript wrapper framework divided between a client and a server for componentizing JavaScript centric widgets, the method comprising:
    receiving a request for a widget to be rendered on the client, the request including a tag that defines a plurality of tag attributes that distinctly identify the widget, the request received by a client runtime component executing on the client, the client runtime component configured to load the widget when a HTML page initially loads on the client;
    forwarding the request to the server,
        the server identifying the widget based on the plurality of tag attributes received by a server-side component, the widget associated with a plurality of component resources; and
        the server generating a JavaScript wrapper code for each of the plurality of component resources associated with the widget and for the widget identified at the server using the plurality of tag attributes, the generated JavaScript wrapper code used in wrapping the widget and the associated plurality of component resources of the widget to provide a customized widget, wherein the wrapping of the widget and the associated plurality of component resources is customized to distinctly identify the widget, the customization enabling the widget to be rendered multiple times on the HTML page at the client without conflicts;
    receiving the wrapper code encompassing the widget and the associated plurality of component resources for the widget at the client; and
    rendering the widget on the HTML page at the client during the initial HTML page load based on information provided by the associated plurality of component resources, the associated plurality of component resources defining behavior and style of the widget, wherein the rendering of the widget further includes injecting each of the plurality of component resources in an order at an appropriate location of the HTML page so that the component resources are evaluated in a global scope of the HTML page when rendered at the client, wherein the plurality of component resources includes at least a component resource from a service and wherein the service is an external service residing on a domain external to a web application domain associated with an application requesting the widget on the client, the external service is associated with a plurality of external component resources, the plurality of external component resources retrieved using a generic proxy residing on the server, the generic proxy configured to provide restricted access to the external service.

2. The method for providing a JavaScript wrapper framework for componentizing JavaScript centric widgets divided between a client and a server of claim 1, further including verifying correctness of the information provided by the associated plurality of component resources, the verification of the correctness performed by the client runtime component on the client.

3. The method for providing a JavaScript wrapper framework for componentizing JavaScript centric widgets divided between a client and a server of claim 1, wherein receiving the associated plurality of component resources further including using default component resources for the widget when the plurality of component resources for the widget is unavailable at the server.

4. The method for providing a JavaScript wrapper framework for componentizing JavaScript centric widgets divided between a client and a server of claim 3, wherein the default component resources for the widget are customized during the wrapping for the widget based on the tag attributes.

5. The method for providing a JavaScript wrapper framework for componentizing JavaScript centric widgets divided between a client and a server of claim 1, wherein the plurality of component resources for the widget are static resources.

6. The method for providing a JavaScript wrapper framework for componentizing JavaScript centric widgets divided between a client and a server of claim 1, where in the widgets are reusable.

7. The method for providing a JavaScript wrapper framework for componentizing JavaScript centric widgets divided between a client and a server of claim 1, wherein the plurality of component resources including the one or more component resources from the service reside on a web domain associated with an application requesting the widget on the client.

8. The method for providing a JavaScript wrapper framework for componentizing JavaScript centric widgets divided between a client and a server of claim 1, wherein the generic proxy includes a transformer configured to provide transformation of format of one or more external resources to a format acceptable by the widget on the client.

9. The method for providing a JavaScript wrapper framework for componentizing JavaScript centric widgets divided between a client and a server of claim 1, wherein the rendering of the widget on the HTML page on the client further including:
    parsing the plurality of external component resources to identify one or more types of component resources;
    creating lists for the component resource available in the plurality of external component resources, wherein each of the lists represents a specific type of component resource;
    parsing component resources of the HTML page to identify and serialize each type of the component resources in an order the component resources appear on the HTML page; and
    injecting the plurality of external component resources identified in each of the list into the HTML page under corresponding type of resource available at the HTML page, such that the component resources under each type of component resources at the HTML page are distinct, wherein the injecting of the plurality of external component resources enabling evaluation of the component resources in global scope of the HTML page.

10. The method for providing a JavaScript wrapper framework for componentizing JavaScript centric widgets divided between a client and a server of claims 1, wherein the widget is associated with a topic, the widget configured to publish content information to a topic based on a triggering of an event associated with the widget at the client, the topic used to share content information between one or more additional widgets on the client.

11. The method for providing a JavaScript wrapper framework for componentizing JavaScript centric widgets divided between a client and a server of claim 10, wherein the event includes one or more of onload, on Save, on Select, loaded, initialized, and loadComplete.

12. The method for providing a JavaScript wrapper framework for componentizing JavaScript centric widgets divided between a client and a server of claim 1, wherein the plurality of tag attributes include one or more of name, script, unique user identification (uuid), service value, arguments, type, template, style sheet and value.

13. The method for providing a JavaScript wrapper framework for componentizing JavaScript centric widgets divided between a client and a server of claim 1, wherein the plurality of component resources are of type HTML template, JavaScript initiation and configuration code, and Cascading Style Sheet.

14. A system for providing a JavaScript wrapper framework for componentizing JavaScript centric widgets divided between a client and a server, the client and the server each having a processor to execute logic associated with the JavaScript wrapper framework, the system comprising:
  a widget model on the client, the client having a processor and memory, to provide a component model for a widget, the widget model including a plurality of component resources that define a behavior and style of a widget so that the widget can be accessed by other components available at the client;
  a client runtime component on the client, the client runtime component including a tag having a plurality of tag-attributes that identifies the widget to be rendered on the client, the client runtime component configured to request the widget from the server using the plurality of tag-attributes, receive the widget having the plurality of component resources from the server, verify correctness of the plurality of component resources received from the server, render the widget on the client and to link the widget with other widgets on the client; and
  a server runtime on the server, the server having a processor and memory, the server runtime interfacing with the client runtime component on the client, the server runtime configured to:
    identify the widget on the server, the identified widget associated with the plurality of component resources;
    track and generate distinct JavaScript wrapper code for the widget and for each of the plurality of component resources associated with the widget;
    wrap the widget and the plurality of component resources associated with the widget available to the server in a customized manner using the generated JavaScript wrapper code, the customization allowing the widget to be rendered multiple times on an HTML page at the client without conflicts;
    serialize data associated with the plurality of component resources in the JavaScript wrapper code such that proper data associated with the plurality of component resources are forwarded to the client,
    wherein the JavaScript wrapper code includes the widget and the associated plurality of component resources of the widget with serialized data, the wrapping of the widget and the associated plurality of component resources is customized so as to allow replication of the widget at the client, the rendering of the widget further includes injecting each of the plurality of component resources in an order at an appropriate location of the HTML page rendered at the client so that the component resources are evaluated in a global scope of the HTML page when rendered at the client, wherein the plurality of component resources includes at least a component resource from a service and wherein the service is an external service residing on a web domain external to a web application domain associated with an application requesting the widget on the client, the external service is associated with a plurality of external component resources, the plurality of external component resources retrieved using a generic proxy component residing on the server, the generic proxy component configured to provide restricted access to the external service.

15. The system for providing a JavaScript wrapper framework for componentizing JavaScript centric widgets divided between a client and a server of claim 14, wherein the client runtime component on the client further including an AJAX mechanism that is configured to communicate with the server using asynchronous communication.

16. The system for providing a JavaScript wrapper framework for componentizing JavaScript centric widgets divided between a client and a server of claim 14, wherein the plurality of component resources including the service resides on a web domain associated with an application executing on the client.

17. The system for providing a JavaScript wrapper framework for componentizing JavaScript centric widgets divided between a client and a server of claim 14, wherein the generic proxy component is configured to perform data conversion so as to provide uniform access to the plurality of component resources.

* * * * *